United States Patent
Gu et al.

(10) Patent No.: US 8,212,942 B2
(45) Date of Patent: Jul. 3, 2012

(54) ALL DIGITAL FRONT-END ARCHITECTURE FOR TELEVISION WITH SIGMA-DELTA ADC INPUT

(75) Inventors: Yongru Gu, Lake Forest, CA (US);
Nabil Yousef Wasily, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 343 days.

(21) Appl. No.: 12/760,405

(22) Filed: Apr. 14, 2010

(65) Prior Publication Data
US 2011/0255011 A1 Oct. 20, 2011

(51) Int. Cl.
*H04N 5/44* (2011.01)
(52) U.S. Cl. .......................... 348/726; 348/725; 375/345
(58) Field of Classification Search .................. 348/725, 348/726, 727, 731–733, 735; 375/345
See application file for complete search history.

(56) References Cited

U.S. PATENT DOCUMENTS

| | | | | |
|---|---|---|---|---|
| 6,005,640 A | * | 12/1999 | Strolle et al. | 348/726 |
| 6,369,857 B1 | * | 4/2002 | Balaban et al. | 348/555 |
| 2010/0328536 A1 | * | 12/2010 | Hendrickson et al. | 348/607 |
| 2011/0096241 A1 | * | 4/2011 | Ahluwalia et al. | 348/726 |

* cited by examiner

*Primary Examiner* — Michael Lee
(74) *Attorney, Agent, or Firm* — Rahman LLC (57) ABSTRACT

A digital front-end architecture for television receivers with sigma-delta ADC input. An input digital signal is fed to the architecture and the gain is controlled by a gain stage. In the first method, the gain stage is controlled by a first AGC. Here, the gain is increased if the first threshold value is larger than the magnitude of a complex phase-locked loop (CPLL) output, and the gain is decreased if the first threshold value is lower than the magnitude of the CPLL output. In the second method, the gain is controlled through a second AGC. The gain is controlled by increasing the gain if the second threshold value is larger than a line peak of the moving average filter output, and the gain is decreased if the second threshold value is lower than the peak. The second threshold value and the peak are compared in a peak search block.

20 Claims, 4 Drawing Sheets

FIG. 4

US 8,212,942 B2

ALL DIGITAL FRONT-END ARCHITECTURE FOR TELEVISION WITH SIGMA-DELTA ADC INPUT

BACKGROUND

1. Technical Field

The embodiments herein generally relate to television receivers, and, more particularly, to analog television receivers.

2. Description of the Related Art

Analog television encodes television picture and sound information and transmits it as an analog signal in which the message conveyed by a broadcast signal is a function of deliberate variations in an amplitude and/or frequency of the signal. All systems preceding digital television, such as NTSC, PAL, or SECAM are analog television systems. Séquentiel couleur à mémoire (SECAM) (Sequential Color with Memory) is a standard for analog color television systems that is also compatible with monochrome television receivers predating its introduction. Because of this compatibility requirement, a second signal is added to the basic monochrome signal, and this signal carries the color information, called chrominance or C for short.

In National Television System Committee (NTSC), chrominance is encoded using two 3.579545 MHz signals that are 90 degrees out of phase, known as I (in-phase) and Q (quadrature) quadrature amplitude modulation (QAM). These two signals are each, amplitude modulated and then added together. Phase Alternating Line (PAL) is another standard for color television broadcasting. In this standard, the color information on the video signal is reversed with each line. A vestigial sideband (VSB) is a sideband that has been only partly cut off or suppressed. Television broadcasts (in analog video formats) use this method if the video is transmitted in AM, due to the large bandwidth used. Sigma-Delta modulation is a method for encoding high resolution signals into lower resolution signals using pulse-density modulation. An analog-to-digital converter (ADC) or digital-to-analog converter (DAC) circuit, which implements this technique can relatively easily achieve very high resolutions while using low-cost complementary metal-oxide-semiconductor (CMOS) processes, such as the processes used to produce digital integrated circuits (ICs).

Traditional digital front-end architecture for television receivers may include an amplitude imbalance correction (ACI) circuit and a phase imbalance correction (PIC) circuit, however, the PIC is generally always placed only after the ACI. In a traditional television, VSB filtering is performed generally only at an intermediate frequency (IF) stage. Finally, in most of the traditional designs, the front-end architectures typically only use analog circuits for processing.

SUMMARY

In view of the foregoing, an embodiment herein provides a method of controlling a gain in an input digital signal received from a sigma-delta analog-to-digital converter ($\Sigma\Delta ADC$) that converts an analog television signal from a tuner to the input digital signal for an analog television receiver, wherein the tuner introduces a DC component to the analog television signal, wherein the input digital signal comprises a video carrier, wherein the video carrier comprising a Luma carrier, and wherein the analog television receiver comprising a first cascaded integrator comb (CIC) filter that receives the input digital signal from the $\Sigma\Delta ADC$; a first down-sampler operatively connected to the first CIC filter, the first down-sampler comprising a down sampling factor of two; a half-band filter operatively connected to the first down-sampler; a second down-sampler operatively connected to the half-band filter; and a first adjacent channel interference (ACI) rejection filter operatively connected to the second down-sampler, wherein the first ACI rejection filter comprises an interpolated filter that provides a sharp transition band performance, wherein the interpolated filter comprises a zero-coefficient for alternate taps, wherein the method comprises smoothing, in a de-ripple (De-RPL) filter, an in-band ripple in a filter response from the CIC filter; removing, in a digital DC offset cancellation block, the DC component introduced by the tuner; removing, in a programmable notch filter, sinusoid spurs at a plurality of multiple locations in the input digital signal; receiving, in a gain stage, at least one gain from any of a first automatic gain control block (AGC) and a second AGC block; detecting, in phase imbalance correction (PIC) circuitry, a correlation between a I and Q components of the video carrier; removing the correlation; detecting, in amplitude correction (AIC) circuitry, an imbalance between the magnitudes of the I and Q components; correcting the imbalance of the I and Q components; and down-mixing, in a direct digital frequency synthesis (DDFS) circuitry, a Luma carrier of the video carrier to approximately DC.

The method further comprises attenuating, in a second cascaded integrator comb (CIC) filter, a high frequency for the input digital signal based on the down-mixing the Luma carrier of the video carrier to the approximately DC. The method further comprises locking, in a complex phase locked-loop (CPLL) block, a phase of the Luma carrier based on the attenuating, in the second CIC filter, the high frequency for the input digital signal; and mixing, in the CPLL block, a recovered Luma carrier with an output signal from a delay alignment block to produce a video signal with the Luma carrier exactly at DC, wherein an output video signal from the CPLL block comprises a baseband video signal with a video carrier exactly at DC, and wherein the output video signal comprises a vestigial band (VSB) signal. The method further comprises converting, in a vestigial band filter, the VSB signal to a double side band (DSB) signal; and separating, in a audio and video separation block, an audio signal and a video signal from the double side band (DSB) signal.

The method further comprises comparing, in a moving average filter, a magnitude of the CPLL output video signal with a first threshold value. The gain is increased when the threshold value is larger than the magnitude of the CPLL output video signal, and wherein the gain is decreased when the threshold value is lower than the magnitude of the CPLL output video signal. The method further comprises searching, in a peak search block, a peak of every input digital signal from an output of the moving average filter; and comparing the peak with a second threshold value. The gain is increased when the threshold value is larger than the peak, and wherein the gain is decreased when the threshold value is lower than the peak. The gain from at least one of the first AGC and the second AGC is received by passing through a multiplexer.

Another embodiment provides a digital front-end architecture to control a gain of an input digital signal for an analog television (TV) receiver, the digital front-end architecture receives the input digital signal from a Sigma-Delta Analog-to-Digital Converter ($\Sigma\Delta ADC$), wherein the $\Sigma\Delta ADC$ converts an analog TV signal from a tuner to the input digital signal, wherein the tuner introduces a DC component, wherein the input digital signal comprises a video carrier, and wherein the video carrier comprises I and Q components, the digital front-end architecture comprising a first cascaded integrator comb (CIC) filter that receives the input digital signal;

a first down sampler operatively connected to the CIC filter that receives an output from the CIC filter, wherein the down sampler comprises a sampling factor of two; a half-band (HB) filter operatively connected to the first down-sampler; a second down sampler operatively connected to the HB filter comprising a sampling factor of two; a first adjacent channel interference (ACI) rejection filter operatively connected to the second down sampler, wherein the first ACI filter comprises an interpolation finite impulse response (FIR) filter that provides a sharp transition band performance, wherein the FIR filter comprises a zero-coefficient for alternate taps; a second ACI filter operatively connected to the first ACI filter, wherein the second ACI filter provides attenuation for a high frequency response of the first ACI filter; a configurable de-ripple (De-RPL) filter operatively connected to the second ACI filter, wherein the configurable de-ripple (De-RPL) filter smoothens an in-band ripple in response to the CIC filter; a digital DC offset cancellation (DCO) unit operatively connected to the De-RPL filter, wherein the DCO unit removes the DC component introduced by the tuner; a programmable notch filter that removes sinusoid spurs at multiple locations in the input digital signal; and a pair of automatic gain control (AGC) blocks that provide an output to adjust the gain of the input digital signal.

The digital front-end architecture further comprises a gain stage that adjusts the gain of the input digital signal based on an input received from the notch filter and the output of the pair of AGC blocks being multiplexed. The digital front-end architecture further comprises phase imbalance correction (PIC) circuitry operatively connected to the gain stage, wherein the PIC circuitry detects a correlation between the magnitudes of the I and Q components and removes the correlation between the magnitudes of the I and Q components; and amplitude correction (AIC) circuitry operatively connected to the PIC circuitry that detects an imbalance between the magnitudes of the I and Q components and corrects the imbalance of the gain. The digital front-end architecture further comprises a direct digital frequency synthesis (DDFS) circuitry that down-mixes the Luma carrier of video carrier to approximately DC; a second cascaded integrator comb (CIC) filter operatively connected to the DDFS circuitry, wherein the second CIC filter attenuates a high frequency of the input digital signal; and a delay alignment block operatively connected to the DDFS circuitry.

The digital front-end architecture further comprises a complex phase locked loop (CPLL) block operatively connected to the second CIC filter and the delay alignment block, wherein the CPLL block receives an output from the second CIC filter to lock the phase of the Luma carrier based on an output of the CIC filter, wherein the DDFS circuitry and the second CIC filter attenuate the frequency components other than the Luma carrier. A recovered Luma carrier is mixed with an output from the delay alignment block in the CPLL block to produce a video signal, wherein the video signal comprises a baseband signal with a video carrier exactly at DC, and wherein the video signal comprises a vestigial band (VSB) signal. The digital front-end architecture further comprises a vestigial band (VSB) block operatively connected to the CPLL block, wherein the VSB block converts the VSB signal to a double side band signal (DSB), and wherein the VSB block comprises a VSB filter that converts the VSB signal to a double side band (DSB) signal.

The digital front-end architecture further comprises an audio/video (A/V) separation block operatively connected to the VSB block, wherein the A/V separation block separates an audio signal and a video signal from the DSB signal; a moving average (MA) filter operatively connected to the A/V separation block, wherein the MA filter compares a magnitude of the CPLL output with a first threshold value, wherein the gain is increased when the threshold value is larger than the magnitude of the CPLL output, and wherein the gain is decreased when the threshold value is lower than the magnitude of the CPLL output; and a peak search block operatively connected to the MA filter, wherein the peak search block detects a peak of every input digital signal from an output of the moving average filter, and compares the peak with a second threshold value. The gain is increased when the threshold value is larger than the peak, and wherein the gain is decreased when the threshold value is lower than the peak.

Another embodiment provides a system to control a gain of an input digital signal for analog television (TV) receiver, the system receiving the input digital signal from a Sigma-Delta Analog-to-Digital Converter ($\Sigma\Delta$ADC), wherein the $\Sigma\Delta$ADC converts an analog TV signal from a tuner to the input digital signal, wherein the tuner introduces a DC component, wherein the input digital signal comprises a video carrier, and wherein the video carrier comprises I and Q components, the system comprising a first cascaded integrator comb (CIC) filter that receives the input digital signal from the $\Sigma\Delta$ADC; a first down-sampler operatively connected to the first CIC filter, the first down-sampler comprising a down sampling factor of two; a half-band filter operatively connected to the first down-sampler; a second down-sampler operatively connected to the half-band filter; a first adjacent channel interference (ACI) rejection filter operatively connected to the second down-sampler, wherein the first ACI rejection filter comprises an interpolated filter that provides a sharp transition band performance, wherein the interpolated filter comprises a zero-coefficient for alternate taps; means for smoothing an in-band ripple in a filter response from the CIC filter; means for removing the DC component introduced by the tuner; means for removing sinusoid spurs at a plurality of multiple locations in the input digital signal; means for receiving at least one gain from at least one of a first automatic gain control block (AGC) and a second AGC block; means for detecting a correlation between I and Q components of the video carrier and removing the correlation; means for detecting an imbalance between the magnitudes of the I and Q components and correcting the imbalance of the I and Q components; means for down-mixing a Luma carrier of the video carrier to approximately DC; means for converting a vestigial band (VSB) signal to a double side band (DSB) signal; means for separating an audio signal and a video signal from the double side band (DSB) signal; means for comparing a magnitude of an output of a complex phase locked-loop (CPLL) block with a first threshold value; means for searching a peak of every input digital signal from an output of a moving average filter; and means for comparing the peak with a second threshold value.

The gain is increased when the threshold value is larger than the magnitude of the CPLL output video signal, wherein the gain is decreased when the threshold value is lower than the magnitude of the CPLL output video signal, wherein the gain is increased when the threshold value is larger than the peak, and wherein the gain is decreased when the threshold value is lower than the peak.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide an all digital front-end architecture for television receivers with sigma-delta ADC input where an input digital signal is fed to the all digital front-end architecture and the gain is controlled by a gain stage 120. The gain can be controlled in two methods. One can select one of the two methods by register setting. In the first method, the gain stage is controlled by a first AGC. In this method, the gain is increased if the first threshold value is larger than the magnitude of a complex phase-locked loop (CPLL) output, and the gain is decreased if the first threshold value is lower than the magnitude of the CPLL output. In the second method, the gain is controlled through a second AGC. The gain is controlled by increasing the gain if the second threshold value is larger than a line peak of the moving average filter output, and the gain is decreased if the second threshold value is lower than the peak. The second threshold value and the peak are compared in a peak search block 144. Referring now to the drawings, and more particularly to FIGS. 1 through 4, where similar reference characters denote corresponding features consistently throughout the figures, there are shown preferred embodiments.

Figure 1:
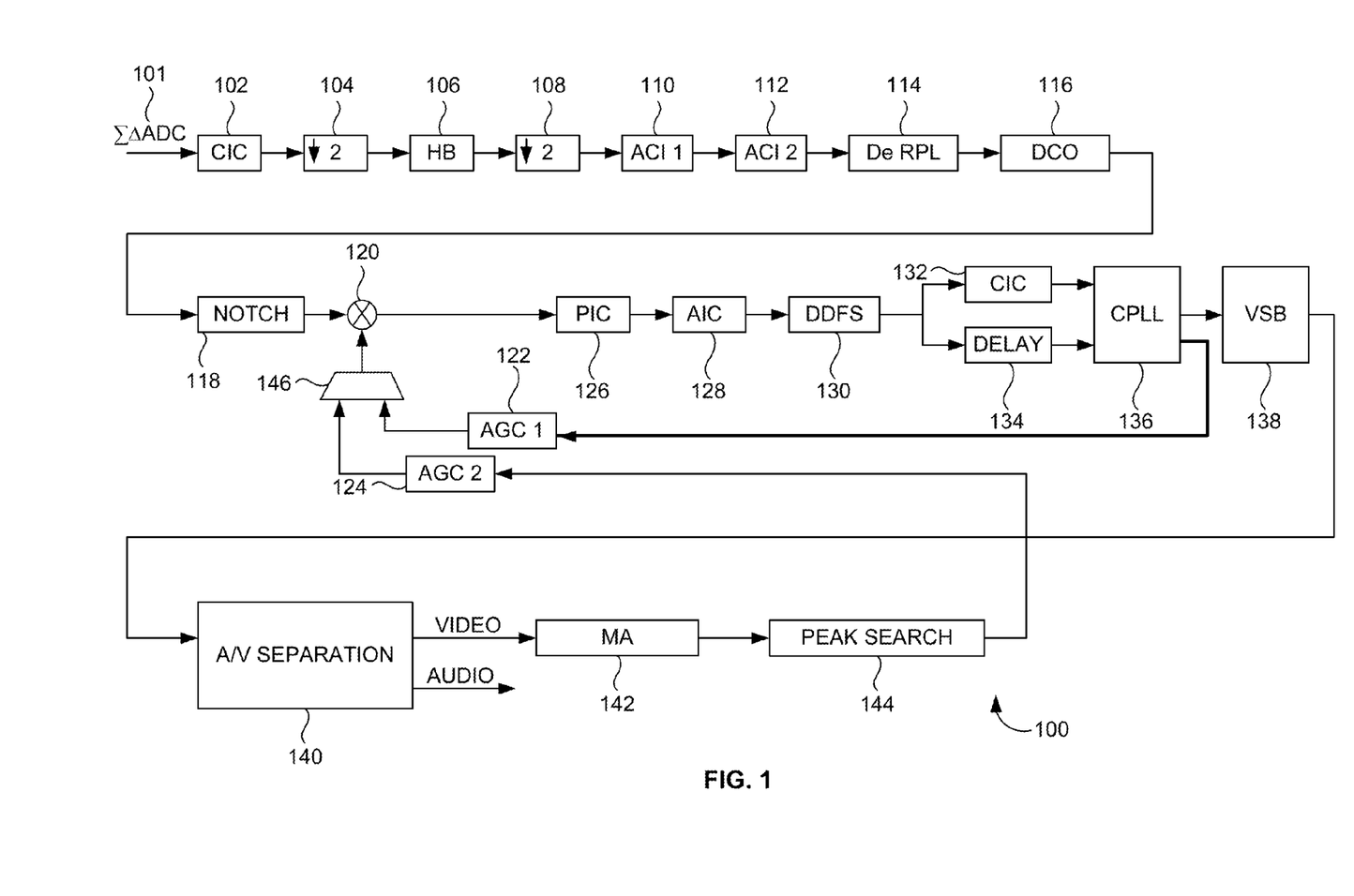
FIG. 1 illustrates an all digital front-end architecture for an analog television (TV) receiver according to an embodiment herein.

FIG. 1 illustrates an all digital front-end architecture 100 for an analog television (TV) receiver (such as receiver 200 of FIG. 2) according to an embodiment herein. The all digital front-end architecture 100 includes a first cascaded integrator comb (CIC) filter 102, a first down-sampler 104, a half-band (HB) filter 106, a second down-sampler 108, a first adjacent channel interference (ACI) rejection filter 110, a second ACI filter 112, a de-ripple (De-RPL) filter 114, a digital DC offset cancellation (DCO) block 116, a notch filter 118, a gain stage 120, a first automatic gain control (AGC) block 122, a second automatic gain control (AGC) block 124, a phase imbalance correction (PIC) circuitry 126, an amplitude correction circuitry (AIC) 128, a direct digital frequency synthesis (DDFS) circuitry 130, a second cascaded integrator comb (CIC) filter 132, a delay alignment block 134, a complex phase locked loop (CPLL) block 136, a first, a vestigial band (VSB) block 138, an audio/video (A/V) separation block 140, a moving average (MA) filter 142, a peak search block 144, and a multiplexer 146 operatively connected to one another.

The CIC filter 102 receives an input signal from a sigma-delta analog-to-digital converter (ΣΔADC) 101. The input digital signal includes four bits for each I and Q components. In one embodiment, the ADC converts the analog TV signal from tuner to digital signal. The first down sampler 104 is operatively connected to the CIC filter 102 that receives an output from the CIC filter 102. The down sampler 104 includes a sampling factor of two. The HB filter 106 is operatively connected to the first down-sampler 104. The second down sampler 108 is operatively connected to the HB filter 106. The first ACI filter 110 is operatively connected to the second down sampler 108. The first ACI filter 110 comprises an interpolation finite impulse response (FIR) filter that provides a sharp transition band performance. The FIR filter includes a zero-coefficient for alternate taps.

The second ACI filter 112 is operatively connected to the first ACI filter 110. The second ACI filter 112 provides attenuation for the high frequency response of the interpolated filter. The De-RPL filter 114 is operatively connected to the second ACI filter 112. The De-RPL filter 114 may be configurable by software and combats the in-band ripple or drop in the filter response from the CIC filter 102 or the analog filter in the tuner (not shown). The DCO block 116 is operatively connected to the De-RPL filter 114. The DCO block 116 removes the DC component introduced by the analog tuner.

The notch filter 118 is operatively connected to the DCO block 116. The notch filter 118 may be programmed by software that removes the sinusoid spurs at multiple locations of the input signal. The gain stage 120 is operatively connected to the notch filter 118. The gain stage 120 receives gain from at least one of the first AGC block 122 or the second AGC block 124. The gain stage 120 increases or decreases amplitude of the input signal. The PIC circuitry 126 is operatively connected to the gain stage 120 and detects the correlation between I and Q components and removes the correlation.

The AIC 128 is operatively connected to the PIC circuitry 126. The AIC 128 detects the imbalance between the magnitudes of I and Q components and corrects the imbalance of the amplitude from the detected imbalance. The DDFS circuitry 130 receives an output from the AIC 128 and down-mixes the TV video carrier (e.g., a Luma carrier) to around DC. The CIC filter 132 (without a built-in down sampler) is operatively connected to the DDFS circuitry 130. The CIC filter 132 attenuates the high frequency signal received from the DDFS circuitry 130. Simultaneously, the output from the DDFS circuitry 130 is also sent to the delay alignment block 134 that is operatively connected to the DDFS circuitry 130. The CPLL block 136 is operatively connected to the CIC filter 132 and the delay alignment block 134. The CPLL block 136 receives the output from the CIC circuitry 132 and locks the phase of the Luma carrier.

The VSB block 138 is operatively connected to the CPLL block 136. The VSB block 138 receives the LUMA carrier locked video signal from the CPLL block 136. In one embodiment, the output of the CPLL block 136 is also sent to the first AGC block 122, where the output of the first AGC block 122 is sent to the gain stage 120 through a multiplexer. In one embodiment, the gain stage is controlled by AGC block 122. The first threshold value is compared with the magnitude of a complex phase-locked loop (CPLL) output in AGC block 122. The gain is increased if the magnitude is smaller than the threshold, and the gain is decreased if the first threshold value is lower than the magnitude of the CPLL output.

The output of VSB block 138 is sent to the audio/video separation block 140 where it separates the audio signal and the video signal. In one embodiment, the output of the VSB block 138 includes the video signal (e.g., a baseband video signal) with a video carrier at DC. This video signal comprises a vestigial band (VSB) signal. In one embodiment, the VSB block 138 includes a VSB filter (not shown) which converts the VSB signal (e.g., the double side band signal (DSB signal)).

Figure 2:
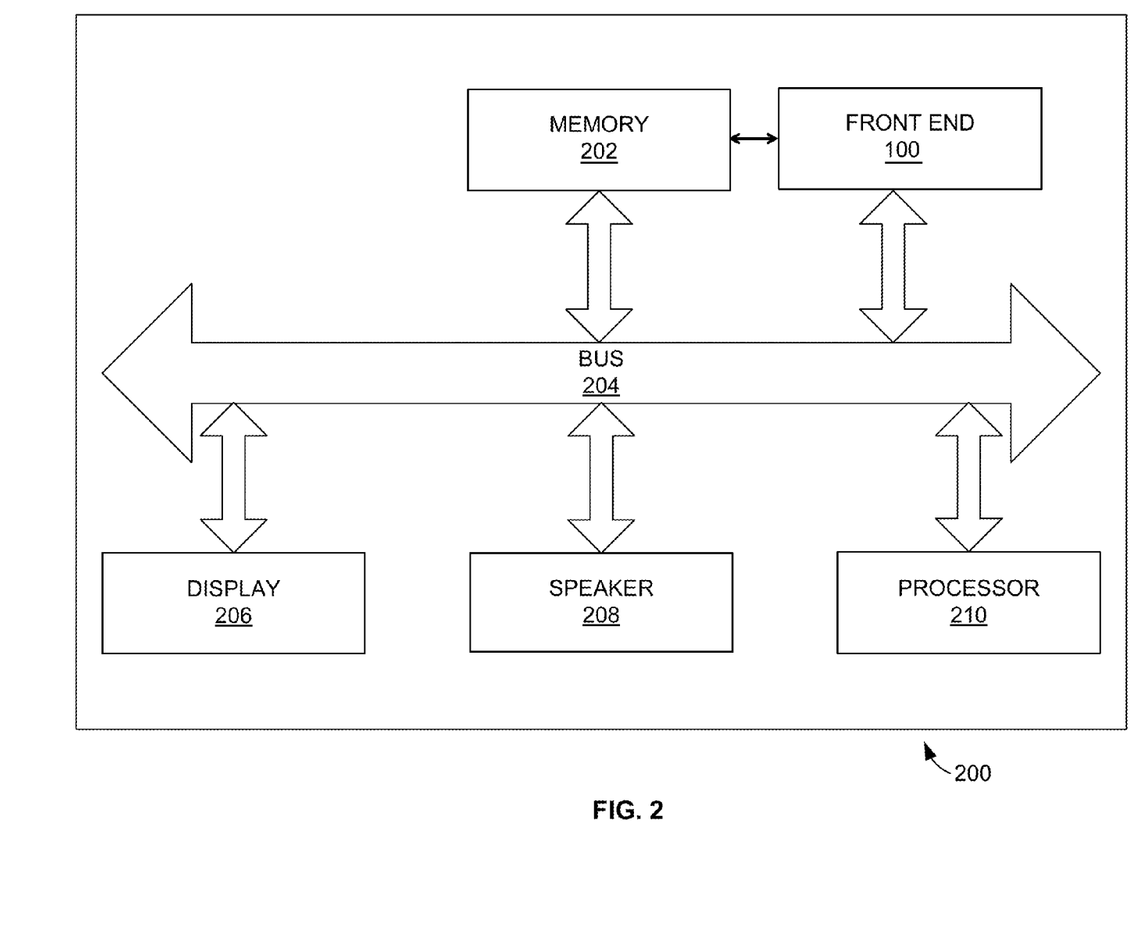
FIG. 2 illustrates an exploded view of an analog television receiver according to an embodiment herein.

The MA filter 142 is operatively connected to the audio/video separation block 140. The MA filter receives the output signal from the audio/video separation block 140, and sends a moving average signal to the peak search 144. The peak search block 144 is operatively connected to the MA filter 142. The peak search block 144 searches a peak of every TV line from the output of the MA filter 142 (e.g., the moving window size is of one line length). In one embodiment, the peak value is compared with a second threshold in AGC block 124, where the output of the first AGC block 124 is sent to the gain stage 120 through a multiplexer 146. The gain is decreased if the second threshold value is lower than the peak. The gain is increased if the second threshold value is larger than the peak. The MA filter 142 and the peak search block 144 are used to control the gain of the signal for every line. In one embodiment, the peak of each line is related to the horizontal and vertical synchronization (HV SYNC) signal in the TV receiver 200 and is constant. The output from the peak search block 144 is sent to the second AGC block 124. The signals from the first AGC block 122 and the second AGC block 124 are multiplexed in the multiplexer 146. The multiplexed output from the multiplexer 146 is fed as an input to the gain stage 120.

FIG. 2 illustrates an exploded view of a receiver 200 having a memory 202 comprising a computer set of instructions. The receiver 200 further includes a bus 204, a display 206, a speaker 208, and a processor 210 capable of processing a set of instructions to perform any one or more of the methodologies herein, according to an embodiment herein. The processor 210 may also enable analog content to be consumed in the form of output via one or more displays 206 or audio for output via speaker and/or earphones 208. The processor 210 may also carry out the methods described herein and in accordance with the embodiments herein. The content may also be stored in the memory 202 for future processing or consumption. A user of the receiver 200 may view this stored information on display 206. When the content is selected, the processor 210 may pass information. The content may be passed among functions within the receiver 200 using bus 204.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can comprise hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
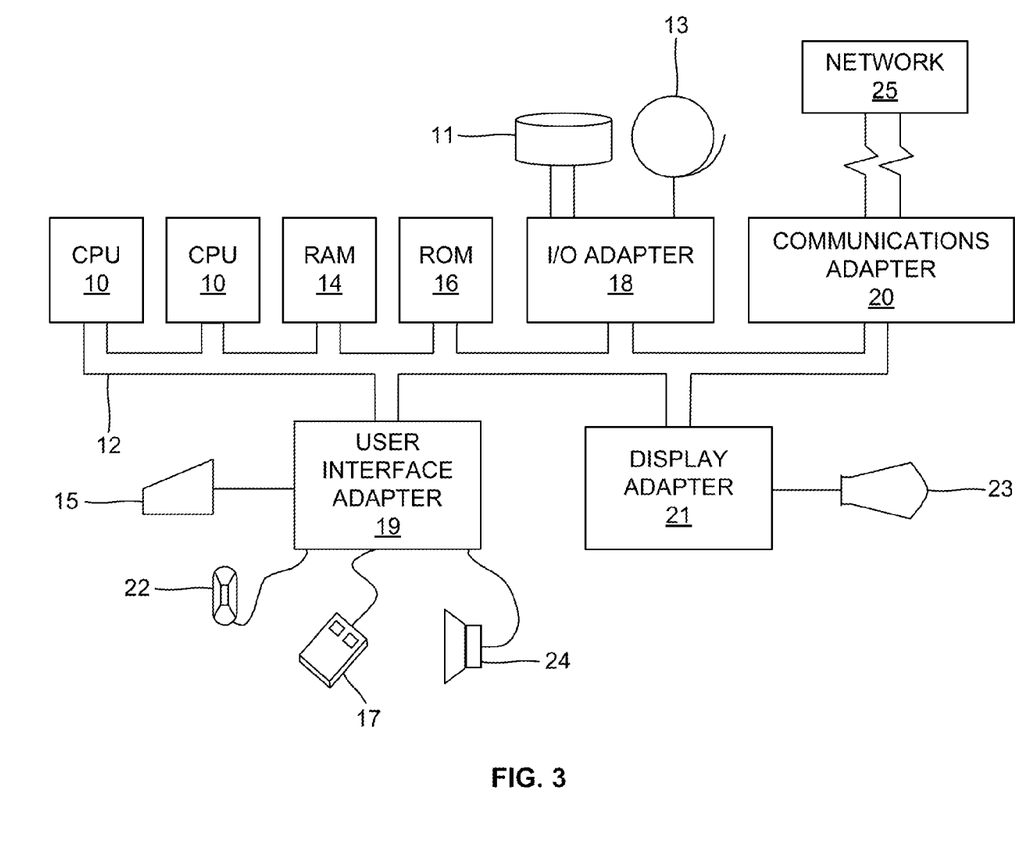
FIG. 3 illustrates a schematic diagram of a computer architecture used in accordance with the embodiments herein.

A representative hardware environment for practicing the embodiments herein is depicted in FIG. 3. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 4:
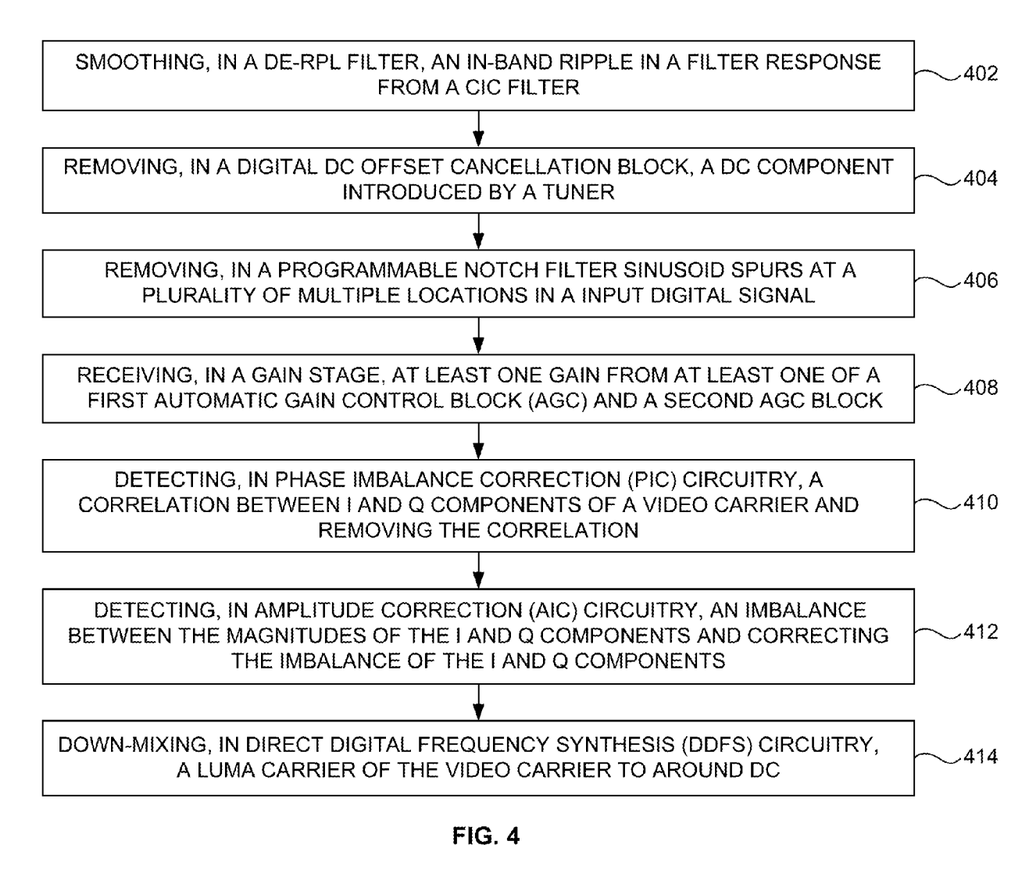
FIG. 4 is a flow diagram illustrating a method of controlling a gain in an input digital signal for an analog TV receiver according to an embodiment herein.

FIG. 4, with reference to FIG. 1 through 3, is a flow diagram illustrating a method of controlling a gain in an input digital signal received from a ΣΔADC 101 that converts an analog TV signal from a tuner (not shown) to the input digital signal for an analog television receiver 200 according to an embodiment herein. The tuner introduces a DC component. The input digital signal includes a video carrier that includes a Luma carrier.

In step 402, an in-band ripple is smoothed in the De-RPL filter 114 in a filter response from the first CIC filter 102. In step 404, the DC component introduced by the tuner is removed in the digital DCO block 116. In step 406, sinusoid spurs are removed at a plurality of multiple locations in the input digital signal in the programmable notch filter 118. In step 408, at least one gain is received from at least one of the first AGC block 122 or the second AGC block 124 in the gain stage 120. In step 410, a correlation between I and Q components of the video carrier is detected and removed in the PIC circuitry 126. In step 412, an imbalance between the magnitudes of the I and Q components is detected and corrected in the AIC 128.

In step 414, a Luma carrier of the video carrier is down-mixed to around DC. A high frequency for the input digital signal is attenuated based on the down-mixing of the Luma carrier of the video carrier to the approximate DC level. A phase of the Luma carrier is locked in the CPLL block 136. A recovered Luma carrier is subsequently mixed with an output signal from the delay alignment block 134 to produce a video signal with said Luma carrier exactly at the DC. An output video signal from the CPLL block 136 comprises a baseband video signal with a video carrier exactly at DC. The output video signal comprises a vestigial band (VSB) signal. The VSB signal is converted to a double side band (DSB) signal.

An audio signal and a video signal are separated from the DSB signal in the audio/video separation block 140. A magnitude of the CPLL output video signal is compared with a first threshold value. The gain is increased if the first threshold value is larger than the magnitude of the CPLL output, and the gain is decreased if the first threshold value is lower than said magnitude of the CPLL output. A peak of every input digital signal is searched in the peak search block 144 from an output of the 142 moving average filter and the peak is compared with a second threshold value. The gain is increased if the second threshold value is larger than the peak, and the gain is decreased if the second threshold value is lower than the peak.

An input digital signal is fed to the all digital front-end architecture 100 and the gain is controlled by the gain stage 120 by increasing the gain if the first threshold value is larger than the magnitude of the CPLL output, and the gain is decreased if the first threshold value is lower than the magnitude of the CPLL output. The first threshold value is compared with the CPLL output in the moving average filter 142. Similarly, the gain is further controlled by increasing the gain if the second threshold value is larger than the peak, and the gain is decreased if the second threshold value is lower than the peak. The second threshold value and the peak is compared in the peak search block 144.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of controlling a gain in an input digital signal received from a sigma-delta analog-to-digital converter (ΣΔADC) that converts an analog television signal from a tuner to said input digital signal for an analog television receiver, wherein said tuner introduces a DC component to said analog television signal, wherein said input digital signal comprises a video carrier, wherein said video carrier comprising a Luma carrier, and wherein said analog television receiver comprising:

a first cascaded integrator comb (CIC) filter that receives said input digital signal from said ΣΔADC;

a first down-sampler operatively connected to said first CIC filter, said first down-sampler comprising a down sampling factor of two;

a half-band filter operatively connected to said first down-sampler;

a second down-sampler operatively connected to said half-band filter; and a first adjacent channel interference (ACI) rejection filter operatively connected to said second down-sampler, wherein said first ACI rejection filter comprises an interpolated filter that provides a sharp transition band performance, wherein said interpolated filter comprises a zero-coefficient for alternate taps, wherein said method comprises:

smoothing, in a de-ripple (De-RPL) filter, an in-band ripple in a filter response from said CIC filter;

removing, in a digital DC offset cancellation block, said DC component introduced by said tuner;

removing, in a programmable notch filter, sinusoid spurs at a plurality of multiple locations in said input digital signal;

receiving, in a gain stage, at least one gain from any of a first automatic gain control block (AGC) and a second AGC block;

detecting, in phase imbalance correction (PIC) circuitry, a correlation between a I and Q components of said video carrier;

removing said correlation;

detecting, in amplitude correction (AIC) circuitry, an imbalance between the magnitudes of said I and Q components;

correcting said imbalance of said I and Q components; and down-mixing, in a direct digital frequency synthesis (DDFS) circuitry, said Luma carrier of said video carrier to approximately DC.

2. The method of claim 1, further comprising attenuating, in a second cascaded integrator comb (CIC) filter, a high frequency for said input digital signal based on said down-mixing said Luma carrier of said video carrier to said approximately DC.

3. The method of claim 2, further comprising:
locking, in a complex phase locked-loop (CPLL) block, a phase of said Luma carrier based on said attenuating, in said second CIC filter, said high frequency for said input digital signal; and
mixing, in said CPLL block, a recovered Luma carrier with an output signal from a delay alignment block to produce a video signal with said Luma carrier exactly at DC,
wherein an output video signal from said CPLL block comprises a baseband video signal with a video carrier exactly at DC, and
wherein said output video signal comprises a vestigial band (VSB) signal.

4. The method of claim 3, further comprising:
converting, in a vestigial band filter, said VSB signal to a double side band (DSB) signal; and
separating, in a audio and video separation block, an audio signal and a video signal from said double side band (DSB) signal.

5. The method of claim 4, further comprising comparing, in a moving average filter, a magnitude of said CPLL output video signal with a first threshold value.

6. The method of claim 5, wherein said gain is increased when said threshold value is larger than said magnitude of said CPLL output video signal, and wherein said gain is decreased when said threshold value is lower than said magnitude of said CPLL output video signal.

7. The method of claim 6, further comprising:
searching, in a peak search block, a peak of every input digital signal from an output of said moving average filter; and
comparing said peak with a second threshold value.

8. The method of claim 7, wherein said gain is increased when said threshold value is larger than said peak, and wherein said gain is decreased when said threshold value is lower than said peak.

9. The method of claim 1, wherein said gain from at least one of said first AGC and said second AGC is received by passing through a multiplexer.

10. A digital front-end architecture to control a gain of an input digital signal for an analog television (TV) receiver, said digital front-end architecture receives said input digital signal from a Sigma-Delta Analog- to-Digital Converter (ΣΔADC), wherein said ΣΔADC converts an analog TV signal from a tuner to said input digital signal, wherein said tuner introduces a DC component, wherein said input digital signal comprises a video carrier, and wherein said video carrier comprises I and Q components, said digital front-end architecture comprising:
a first cascaded integrator comb (CIC) filter that receives said input digital signal;
a first down sampler operatively connected to said CIC filter that receives an output from said CIC filter, wherein said down sampler comprises a sampling factor of two;
a half-band (HB) filter operatively connected to said first down-sampler;
a second down sampler operatively connected to said HB filter comprising a sampling factor of two;
a first adjacent channel interference (ACI) rejection filter operatively connected to said second down sampler, wherein said first ACI filter comprises an interpolation finite impulse response (FIR) filter that provides a sharp transition band performance, wherein said FIR filter comprises a zero-coefficient for alternate taps;
a second ACI filter operatively connected to said first ACI filter, wherein said second ACI filter provides attenuation for a high frequency response of said first ACI filter;
a configurable de-ripple (De-RPL) filter operatively connected to said second ACI filter, wherein said configurable de-ripple (De-RPL) filter smoothens an in-band ripple in response to said CIC filter;
a digital DC offset cancellation (DCO) unit operatively connected to said De-RPL filter, wherein said DCO unit removes said DC component introduced by said tuner;
a programmable notch filter that removes sinusoid spurs at multiple locations in said input digital signal; and
a pair of automatic gain control (AGC) blocks that provide an output to adjust said gain of said input digital signal.

11. The digital front-end architecture of claim 10, further comprising a gain stage that adjusts said gain of said input digital signal based on an input received from said notch filter and said output of said pair of AGC blocks being multiplexed.

12. The digital front-end architecture of claim 11, further comprising:
phase imbalance correction (PIC) circuitry operatively connected to said gain stage, wherein said PIC circuitry detects a correlation between the magnitudes of said I and Q components and removes said correlation between the magnitudes of said I and Q components; and
amplitude correction (AIC) circuitry operatively connected to said PIC circuitry that detects an imbalance between the magnitudes of said I and Q components and corrects said imbalance of the gain.

13. The digital front-end architecture of claim 12, further comprising:
a direct digital frequency synthesis (DDFS) circuitry that down-mixes a Luma carrier of video carrier to approximately DC;
a second cascaded integrator comb (CIC) filter operatively connected to said DDFS circuitry, wherein said second CIC filter attenuates a high frequency of said input digital signal; and
a delay alignment block operatively connected to said DDFS circuitry.

14. The digital front-end architecture of claim 13, further comprising a complex phase locked loop (CPLL) block operatively connected to said second CIC filter and said delay alignment block, wherein said CPLL block receives an output from said second CIC filter to lock the phase of said Luma carrier based on an output of said CIC filter, wherein said DDFS circuitry and said second CIC filter attenuate the frequency components other than said Luma carrier.

15. The digital front-end architecture of claim 14, wherein a recovered Luma carrier is mixed with an output from said delay alignment block in said CPLL block to produce a video signal, wherein said video signal comprises a baseband signal with a video carrier exactly at DC, and wherein said video signal comprises a vestigial band (VSB) signal.

16. The digital front-end architecture of claim 15, further comprising a vestigial band (VSB) block operatively connected to said CPLL block, wherein said VSB block converts said VSB signal to a double side band signal (DSB), and wherein said VSB block comprises a VSB filter that converts said VSB signal to a double side band (DSB) signal.

17. The digital front-end architecture of claim 16, further comprising:
an audio/video (A/V) separation block operatively connected to said VSB block, wherein said A/V separation block separates an audio signal and a video signal from said DSB signal;
a moving average (MA) filter operatively connected to said A/V separation block, wherein said MA filter compares a magnitude of said CPLL output with a first threshold value, wherein said gain is increased when said threshold value is larger than said magnitude of said CPLL output, and wherein said gain is decreased when said threshold value is lower than said magnitude of said CPLL output; and
a peak search block operatively connected to said MA filter, wherein said peak search block detects a peak of every input digital signal from an output of said moving average filter, and compares said peak with a second threshold value.

18. The digital front-end architecture of claim 17, wherein said gain is increased when said threshold value is larger than said peak, and wherein said gain is decreased when said threshold value is lower than said peak.

19. A system to control a gain of an input digital signal for analog television (TV) receiver, said system receiving said input digital signal from a Sigma-Delta Analog-to-Digital Converter (ΣΔADC), wherein said ΣΔADC converts an analog TV signal from a tuner to said input digital signal, wherein said tuner introduces a DC component, wherein said input digital signal comprises a video carrier, and wherein said video carrier comprises I and Q components, said system comprising:
a first cascaded integrator comb (CIC) filter that receives said input digital signal from said ΣΔADC;
a first down-sampler operatively connected to said first CIC filter, said first down-sampler comprising a down sampling factor of two;
a half-band filter operatively connected to said first down-sampler;
a second down-sampler operatively connected to said half-band filter;
a first adjacent channel interference (ACI) rejection filter operatively connected to said second down-sampler, wherein said first ACI rejection filter comprises an interpolated filter that provides a sharp transition band performance, wherein said interpolated filter comprises a zero-coefficient for alternate taps;
means for smoothing an in-band ripple in a filter response from said CIC filter;
means for removing said DC component introduced by said tuner;
means for removing sinusoid spurs at a plurality of multiple locations in said input digital signal;
means for receiving at least one gain from at least one of a first automatic gain control block (AGC) and a second AGC block;
means for detecting a correlation between I and Q components of said video carrier and removing said correlation;
means for detecting an imbalance between the magnitudes of said I and Q components and correcting said imbalance of said I and Q components;
means for down-mixing a Luma carrier of said video carrier to approximately DC;
means for converting a vestigial band (VSB) signal to a double side band (DSB) signal;
means for separating an audio signal and a video signal from said double side band (DSB) signal;
means for comparing a magnitude of an output of a complex phase locked-loop (CPLL) block with a first threshold value;
means for searching a peak of every input digital signal from an output of a moving average filter; and
means for comparing said peak with a second threshold value.

20. The system of claim 19, wherein said gain is increased when said threshold value is larger than said magnitude of said CPLL output video signal, wherein said gain is decreased when said threshold value is lower than said magnitude of said CPLL output video signal, wherein said gain is increased when said threshold value is larger than said peak, and wherein said gain is decreased when said threshold value is lower than said peak.

* * * * *